United States Patent
Yamagishi

(10) Patent No.: US 7,525,748 B2
(45) Date of Patent: Apr. 28, 2009

(54) INFORMATION RECORDING/REPRODUCING APPARATUS

(75) Inventor: Michinaga Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/474,835

(22) Filed: Jun. 26, 2006

(65) Prior Publication Data
US 2007/0206305 A1    Sep. 6, 2007

(30) Foreign Application Priority Data
Mar. 6, 2006    (JP) .............. 2006-059579

(51) Int. Cl.
*G11B 5/09* (2006.01)
*G11B 27/36* (2006.01)

(52) U.S. Cl. .......................... 360/53; 360/31
(58) Field of Classification Search .......... None
See application file for complete search history.

(56) References Cited

U.S. PATENT DOCUMENTS

| 6,947,234 B2 * | 9/2005 | Lamberts et al. ............. 360/53 |
| 6,957,379 B1 * | 10/2005 | Patapoutian et al. ........ 714/774 |
| 2006/0245102 A1 * | 11/2006 | Cheng ........................... 360/53 |
| 2007/0047122 A1 * | 3/2007 | Czarnecki et al. ............ 360/55 |

OTHER PUBLICATIONS

High-Density Perpendicular Recording Technology <URL: Hyperlink http://magazine.fujitsu.com/vol56-4/paper04.pdf>; Sep. 12, 2005.

* cited by examiner

*Primary Examiner*—Andrew L Sniezek
(74) *Attorney, Agent, or Firm*—Greer, Burns & Crain, Ltd.

(57) ABSTRACT

A determining unit retrieves status information relating to recording or reproducing data on the magnetic disk, and determines whether to re-record data recorded in a recording area on the magnetic disk based on the retrieved status information. When the determining unit determines to re-record first data recorded in a first recording area, a re-recording unit re-records at least one of the first data and second data recorded in a second recording area near the first recording area on the magnetic disk.

8 Claims, 4 Drawing Sheets

FIG.2

| RECORDING ADDRESS | RECORD COUNT | MONITOR AREA ADDRESS |
|---|---|---|
| 10000 | 2,500 | 20000~21000 |
| 10001 | 1,200 | 21001~22000 |
| 10002 | 900 | 22001~23000 |
| ⋮ | ⋮ | ⋮ |

FIG.3

| REPRODUCING ADDRESS | RE-RECORDING AREA ADDRESS |
|---|---|
| 10000 | 10000~21000 |
| 10001 | 10001~21001 |
| ⋮ | ⋮ |

INFORMATION RECORDING/REPRODUCING APPARATUS

BACKGROUND OF THE INVENTION

1. Field of the Invention

The present invention generally relates to a technology for preventing degradation of data recorded in a recording medium.

2. Description of the Related Art

Recently, with the development and spread of broadband communication or digitalized-home-electric appliances, higher and higher capacity of a hard disk drive (HDD) has been increasingly required. Although there have been various methods for increasing memory capacity of the HDD, because a package for storing a magnetic disk is limited in size, a method for increasing a recording density of the magnetic disk is more effective. For example, a perpendicular recording method is known as one of the methods for recording data with accuracy to the magnetic disk having higher recording densities.

However, with the perpendicular recording method, when data is recorded repeatedly in a recording area, data recorded in a neighboring track of the recording area (i.e., servo data used for controlling a position of a magnetic head or user information) gets degraded, thereby making reproduction of the data difficult.

"High-Density Perpendicular Recording Technology", Takuya Uzumaki, published at http://magazine.fujitsu.com/vol56-4/paper04.pdf, discloses a technology for preventing data recorded on a magnetic disk from degradation by coating the magnetic disk with magnetic layer called soft under-layer (SUL) to generate larger magnetic field with magnetic interaction between a magnetic head and the SUL.

However, with the conventional perpendicular recording method, it is required to substantially improve configurations of the magnetic disk and the magnetic head (for example, it is necessary to provide the SUL on the magnetic disk in the above technology), thereby considerably increasing costs for producing the HDD. Thus, there is a need for a technology for preventing data recorded on the magnetic disk from degradation caused by recording data repeatedly without substantially improving the configurations of the magnetic disk and the magnetic head.

SUMMARY OF THE INVENTION

It is an object of the present invention to at least partially solve the problems in the conventional technology.

An apparatus according to one aspect of the present invention is for recording or reproducing data on a magnetic disk. The apparatus includes a determining unit that retrieves status information relating to recording or reproducing data on the magnetic disk, and determines whether to re-record data recorded in a recording area on the magnetic disk based on the retrieved status information; and a re-recording unit that re-records, when the determining unit determines to re-record first data recorded in a first recording area, at least one of the first data and second data recorded in a second recording area near the first recording area on the magnetic disk.

A method according to another aspect of the present invention is for recording or reproducing data on a magnetic disk. The method includes determining including retrieving status information relating to recording or reproducing data on the magnetic disk, and determining whether to re-record data recorded in a recording area on the magnetic disk based on the retrieved status information; and re-recording, when it is determined to re-record first data recorded in a first recording area at the determining, at least one of the first data and second data recorded in a second recording area near the first recording area on the magnetic disk.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of the contents of a record-count management table shown in FIG. 1;

FIG. 3 is an example of the contents of a recording-area management table shown in FIG. 1;

DETAILED DESCRIPTION OF THE PREFERRED EMBODIMENTS

Exemplary embodiments of the present invention are explained below in detail with reference to the accompanying drawings.

A magnetic disk device according to an embodiment of the present invention will be explained below in detail as one of the examples of information recording/reproducing apparatuses. The magnetic disk device retrieves status information relating to recording data to or reproducing data from a magnetic disk. The status information includes a record count, an error rate, and magnetic field strength with respect to a recording area of the magnetic disk.

The magnetic disk device determines whether to re-record data recorded on the magnetic disk based on the retrieved status information, and upon determining to re-record the data, the magnetic disk device re-records the data to the magnetic disk. More specifically, when a record count of data recorded in a recording area is equal to or more than a threshold of the record count, the magnetic disk device re-records data recorded in neighboring recording areas. Similarly, when the error rate of data recorded in a recording area is equal to or more than a threshold of the error rate, the magnetic disk device re-records the data recorded in the recording area and data recorded in neighboring recording areas. Furthermore, when magnetic field strength of data recorded in a recording area is less than a threshold of the magnetic field strength, the magnetic disk device re-records the data recorded in the recording area and data recorded in neighboring recording areas.

As described above, the magnetic disk device according to the present embodiment re-records the data recorded on the magnetic disk according to the status information so that it becomes possible to prevent the data from degradation and to solve problems in relation to age-related degradation of the data. Furthermore, the magnetic disk device does not require a magnetic disk or a magnetic head to be substantially improved in configurations from current magnetic disks or magnetic heads, thereby considerably reducing costs for producing the magnetic disk.

Figure 1:
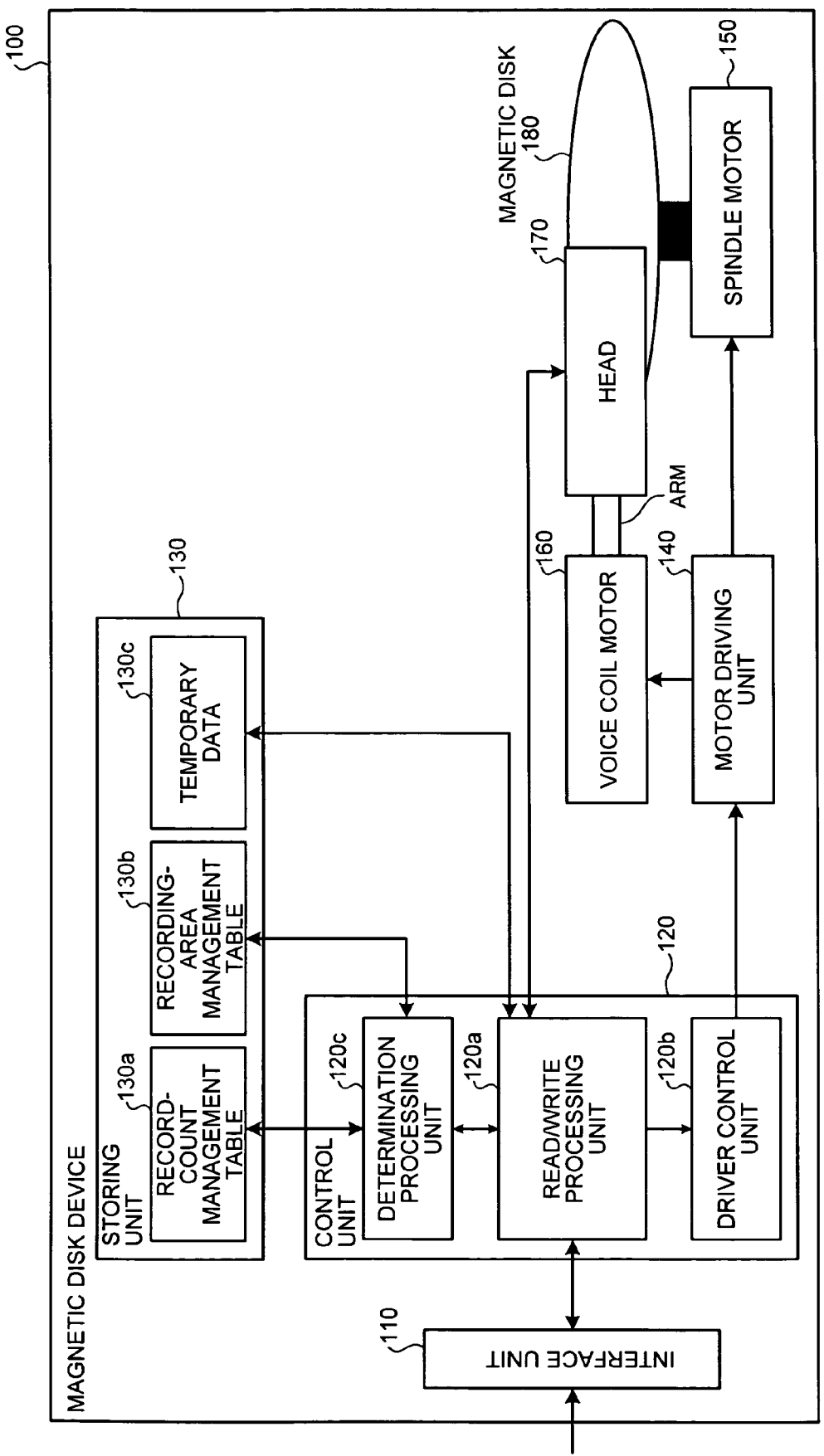
FIG. 1 is a detailed functional block diagram of a magnetic disk device according to an embodiment of the present invention.

FIG. 1 is a detailed functional block diagram of a magnetic disk device 100 according to an embodiment of the present invention. The magnetic disk device 100 includes an interface unit 110, a control unit 120, a storing unit 130, a motor driving unit 140, a spindle motor 150, a voice coil motor 160, a head 170, and a magnetic disk 180. Although it is not shown in FIG. 1, the magnetic disk device is connected to a computer terminal that sends a request for recording data to or reproducing data from the magnetic disk device 100.

The interface unit 110 conducts data communication to the computer terminal that is connected to the magnetic disk device 100 by using a predetermined protocol. Upon receiving a request from the computer terminal for recording data or reproducing data, the control unit 120 controls the motor driving unit 140 and the head 170 to record data to or reproduce data from the magnetic disk 180.

The magnetic disk 180 is a recording medium made with resinous thin disk coated with a magnetic material. To record data on the magnetic disk 180, magnetic field is applied to a recording area of the magnetic disk 180 with the head 170, thereby transforming magnetized state of the magnetic material in the recording area on the magnetic disk 180. On the other hand, to reproduce the data from the magnetic disk 180, the head 170 shifts to a recording area of the magnetic disk 180 from which the data is to be reproduced, thereby retrieving magnetized state of the magnetic material in the recording area on the magnetic disk 180.

The motor driving unit 140 controls the spindle motor 150 and the voice coil motor 160 based on control signals input from the control unit 120. The spindle motor 150 is used for rotating the magnetic disk 180 while the voice coil motor 160 is used for shifting the head 170 attached to an arm.

The control unit 120 includes a read/write processing unit 120a, a driver control unit 120b, and a determination processing unit 120c. The read/write processing unit 120a controls the driver control unit 120b and the head 170, thereby recording data to and reproducing data from the magnetic disk 180.

Upon receiving data to be recorded to the magnetic disk 180 from the computer terminal, the read/write processing unit 120a specifies an address set on the magnetic disc to which the data is to be recorded and passes information of the specified address (hereinafter, "address information") to the driver control unit 120b and the determination processing unit 120c. Subsequently, the read/write processing unit 120a controls the head 170, thereby recording the data to the magnetic disk 180.

The driver control unit 120b retrieves the address information from the read/write processing unit 120a and extracts control signals to the motor driving unit 140 so that the head 170 shifts to a recording area corresponding to the address information. The determination processing unit 120c retrieves the address information from the read/write processing unit 120a and determines whether to re-record the data recorded on the magnetic disk 180 by using the retrieved address information and a record-count management table 130a that is recorded in the storing unit 130. Upon determining to re-record the data, the determination processing unit 120c passes the address information corresponding to the data to be re-recorded on the magnetic disk 180 to the read/write processing unit 120a.

FIG. 2 is an example of the contents of the record-count management table 130a. The record-count management table 130a includes a recording address, a record count, and a monitor area address. The recording address is used for associating with the address information retrieved from the read/write processing unit 120a. The record count indicates how many times the data is recorded in a recording area corresponding to the recording address. The monitor area address is an address corresponding to a neighboring recording area of the recording area corresponding to the recording address.

Upon retrieving the recording address of 10000 from the read/write processing unit 120a, the determination processing unit 120c increments the record count corresponding to the recording address 10000 from 2,500 to 2,501. Subsequently, the determination processing unit 120c determines whether a record count is equal to or more than a threshold of the record count and when the record count is determined to be equal to or more than the threshold of the record count, the determination processing unit 120c passes information of the monitor area address corresponding to the recording address (hereinafter, "monitor address information") to the read/write processing unit 120a. For example, if the threshold of the record count is set as 2,501, the record count corresponding to the recording address 10000 is equal to the threshold of the record count, so the determination processing unit 120c passes the monitor address information 20000 to 21000 to the read/write processing unit 120a. After passing the monitor address information to the read/write processing unit 120a, the determination processing unit 120c resets the record count corresponding to the recording address. Namely, the record count of 2,501 is reset to zero.

Upon receiving the monitor address information from the determination processing unit 120c, the read/write processing unit 120a passes the retrieved monitor address information to the driver control unit 120b, controls the head 170 to retrieve data recorded in a recording area corresponding to the monitor address information, and temporarily records the retrieved data as temporary data 130c in the storing unit 130. Subsequently, the read/write processing unit 120a re-records the temporary data 130c in the recording area corresponding to the monitor address information on the magnetic disk 180.

Upon receiving a request from the computer terminal for reproducing data from the magnetic disk 180, the read/write processing unit 120a specifies an address corresponding to a recording area from which the data is to be reproduced and passes address information of the specified address to the driver control unit 120b. Subsequently, the read/write processing unit 120a controls the head 170 to retrieve the data recorded in a recording area corresponding to the address information, and detects an error rate and magnetic field strength corresponding to the recording area from which the data is to be reproduced. Then, the read/write processing unit 120a passes the retrieved data to the computer terminal and passes the address information, the error rate, and the magnetic field strength to the determination processing unit 120c.

Upon receiving the address information, the error rate, and the magnetic field strength from the read/write processing unit 120a, the determination processing unit 120c determines whether the error rate is equal to or more than the threshold of the error rate and the magnetic field strength is less than the threshold of the magnetic-filed strength, and determines whether to re-record the data recorded in the magnetic disk 180.

When the error rate is more than the threshold of the error rate and at the same time the magnetic field strength is less than the threshold of the magnetic field strength, the determination processing unit 120c determines to re-record the data recorded on the magnetic disk 180. Upon determining to re-record the data, the determination processing unit 120c specifies address information corresponding to a re-recording area (hereinafter, "re-recording-area address information")

by using a recording-area management table 130b and passes the re-recording-area address information to the read/write processing unit 120a.

FIG. 3 is an example of the contents of the recording-area management table 130b. The recording-area management table 130b includes reproducing addresses and re-recording-area addresses. The reproducing address is used for associating with the address information retrieved from the read/write processing unit 120a. The re-recording-area address indicates an address of a recording area corresponding to the re-recording address (re-recording-area) and an address of a neighboring recording area of the re-recording-area.

Upon retrieving the address information 10000 from the read/write processing unit 120a, the determination processing unit 120c passes the re-recording-area address information 10000 to 21000 to the read/write processing unit 120a.

Upon receiving the re-recording-area address information from the determination processing unit 120c, the read/write processing unit 120a passes the retrieved re-recording-area address information to the driver control unit 120b, controls the head 170 to retrieve information of a recording area corresponding to the re-recording-area address information, and temporarily stores the retrieved information as the temporary data 130c in the storing unit 130. Then, the read/write processing unit 120a re-records the temporary data 130c to a recording area corresponding to the re-recording-area address information on the magnetic disk 180.

Figure 4:
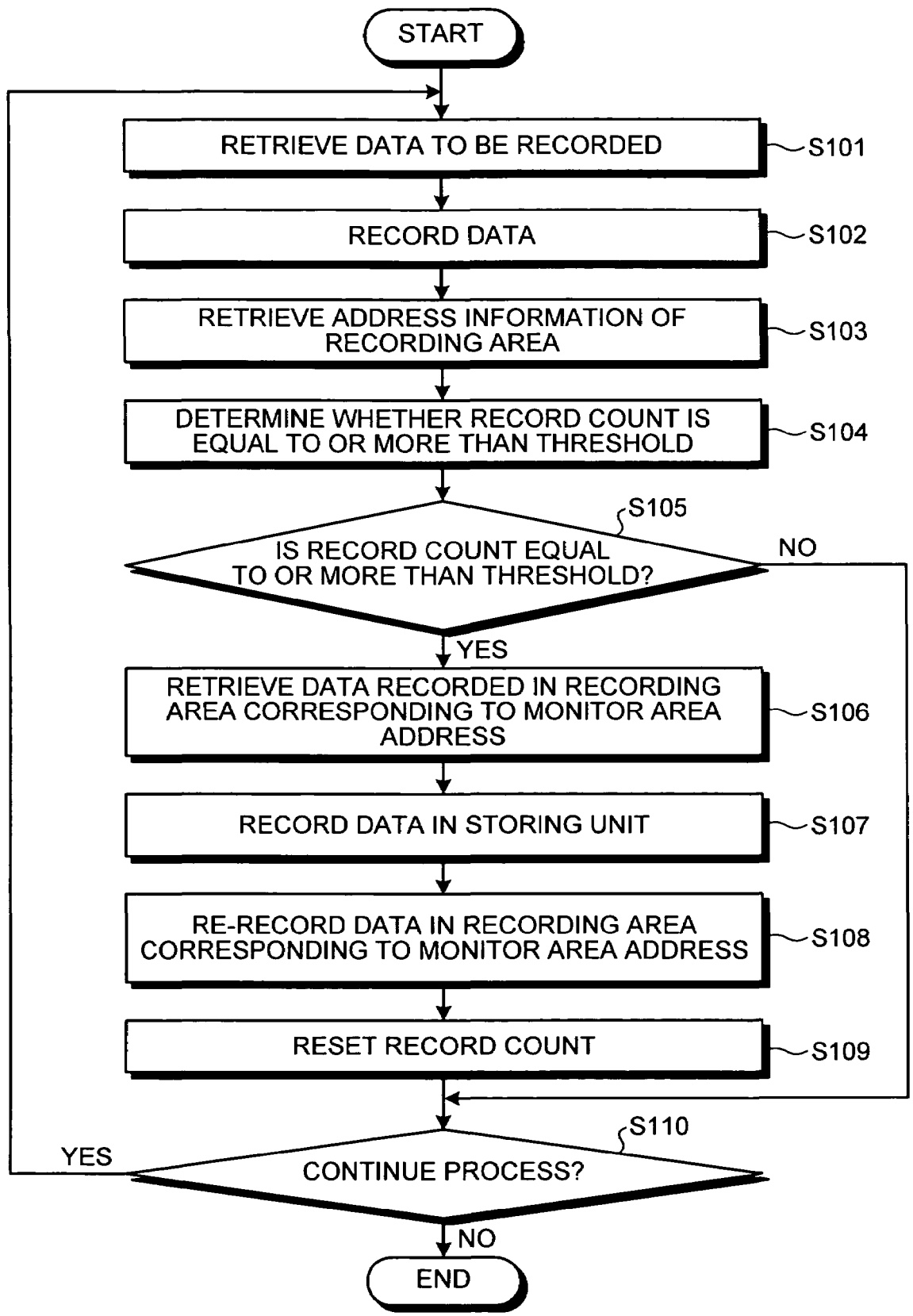
FIG. 4 is a flowchart for explaining an operation of recording data to a magnetic disk performed by a magnetic disk device shown in FIG. 1.

FIG. 4 is a flowchart for explaining an operation for recording data to the magnetic disk 180 performed by the magnetic disk device 100. In the magnetic disk device 100, the read/write processing unit 120a receives data to be recorded on the magnetic disk 180 via the interface unit 110 (step S101), and records the data to the magnetic disk 180 by using the head 170 and the driver control unit 120b (step S102). Subsequently, the determination processing unit 120c retrieves the address information corresponding to a recording area in which the data is to be recorded from the read/write processing unit 120a (step S103), and determines whether the record count is equal to or more than the threshold of the record count by referring to the record-count management table 130a (step S104). When the record count is determined to be equal to or more than the threshold of the record count (YES at step S105), the determination processing unit 120c retrieves the data recorded in a recording area corresponding to the monitor area address and passes the retrieved data to the read/write processing unit 120a (step S106).

Upon retrieving the monitor address information, the read/write processing unit 120a retrieves data in the recording area corresponding to the monitor address information on the magnetic disk 180 and stores the retrieved data as the temporary data 130c to the storing unit 130 (step S107). Then, the read/write processing unit 120a re-records the temporary data 130c to the recording area corresponding to the monitor address information (step S108), and resets the record count (step S109). If the magnetic disk device 100 continues to the above operation (YES at step S110), the process control proceeds to step S101, and if not continues to the above operation (NO at step S110), process terminates. On the other hand, if the record count is less than the threshold of the record count (NO at step S105), the process control proceeds to step S110.

As described above, the determination processing unit 120c determines whether to re-record the data based on the address information and the record-count management table 130a, and if the determination processing unit 120c determines to re-record the data, the read/write processing unit 120a re-records the data corresponding to the monitor address information, thereby preventing the data recorded in the recording area from degradation caused by increasing record counts.

Figure 5:
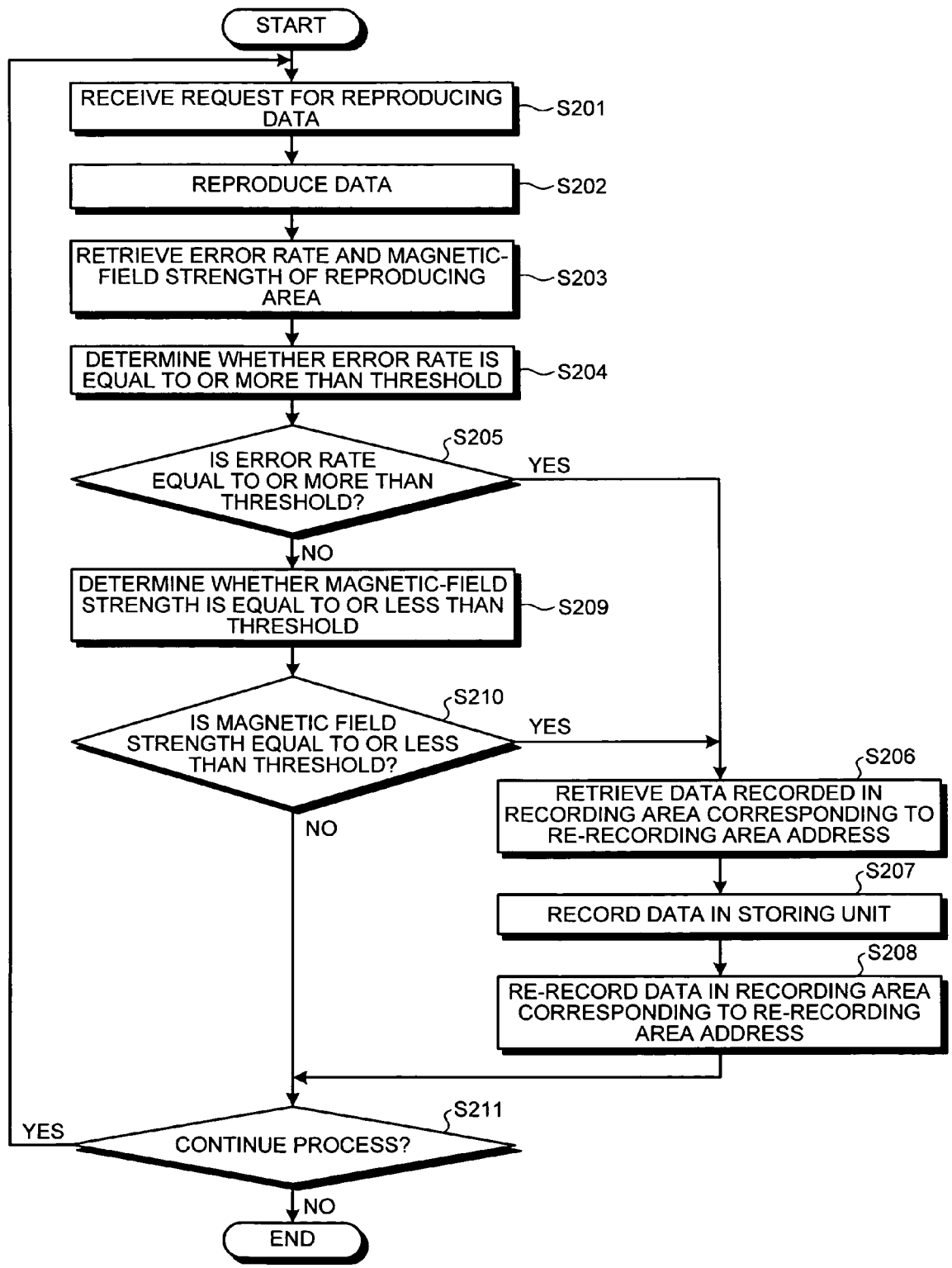
FIG. 5 is a flowchart for explaining an operation of reproducing data from a magnetic disk performed by the magnetic disk device.

FIG. 5 is a flowchart for explaining an operation for reproducing data from the magnetic disk 180 performed by the magnetic disk device 100. In the magnetic disk device 100, the read/write processing unit 120a receives a request for reproducing data from a computer terminal via the interface unit 110 (step S201), reproduces the data recorded on the magnetic disk 180 by using the head 170 and the driver control unit 120b (step S202), and retrieves the error rate and the magnetic field strength corresponding to a reproducing area on the magnetic disk 180 (step S203). Subsequently, the determination processing unit 120c retrieves the error rate and the magnetic field strength from the read/write processing unit 120a and determines whether the error rate is equal to or more than the threshold of the error rate (step S204). Upon determining that the error rate is equal to or more than the threshold value of the error rate (YES at step S205), the determination processing unit 120c retrieves the data recorded in a recording area corresponding to the re-recording-area address in the recording-area management table 130b (step S206), and passes the retrieved data to the read/write processing unit 120a.

Upon receiving the re-recording-area address information from the determination processing unit 120c, the read/write processing unit 120a temporarily stores the data recorded in a recording area corresponding to the re-recording-area address information on the magnetic disk 180 to the storing unit 130 (step S207), and re-records the temporarily stored data in the storing unit 130 to the recording area corresponding to the re-recording-area address information (step S208). Then, the process control proceeds to step S211.

When the error rate is less than the threshold of the error rate (NO at step S205), the determination processing unit 120c determines whether the magnetic field strength is less than the threshold of the magnetic field strength (step S209). When the magnetic field strength is less than the threshold of the magnetic field strength (YES at step S210), the process control proceeds to step S206.

On the contrary, when the magnetic field strength is equal to or more than the threshold of the magnetic-filed strength (NO at step S210), the magnetic disk device 100 determines whether to continue the operation or terminate the operation. When the magnetic disk device 100 determines to continue the operation (YES at step S211), the process control proceeds to step S201, and if not to continue the operation (NO at step S211), the process terminates.

As described above, upon reproducing the data from the magnetic disk 180, the read/write processing unit 120a retrieves the error rate and the magnetic field strength and the determination processing unit 120c determines whether to re-record the data recorded on the magnetic disk 180 based on the retrieved error rate and the magnetic field strength. When the determination processing unit 120c determines to re-record the data, the read/write processing unit 120a re-records the data, thereby effectively preventing the data recorded on the magnetic disk 180 from degradation.

According to an embodiment of the present invention, upon recording the data to or reproducing the data from the magnetic disk 180, the determination processing unit 120c determines whether to re-record the data recorded on the magnetic disk 180 based on the record count, the error rate, and the magnetic field strength. When the determination processing unit 120c determines to re-record the data, the read/write processing unit 120a re-records the data in a recording area corresponding to the monitor area address or the rerecording-area address, thereby solving problems related to degradation of the data on the magnetic disk 180. Furthermore, the magnetic disk device 100 according to the present embodiment does not require the magnetic disk 180 and the head 170 to be substantially improved in configurations, thereby considerably reducing costs for producing the magnetic disk device 100.

Moreover, according to an embodiment of the present invention, the magnetic disk device 100 can be downsized and costs can be reduced by arranging the read/write processing unit 120a, the driver control unit 120b, the determination processing unit 120c, and the like on the same substrate.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for recording or reproducing data on a magnetic disk that employs a perpendicular magnetic recording and includes a recording area and a monitor area storing data of a neighboring area of the recording area, the apparatus comprising:
   a determining unit that retrieves status information relating to recording or reproducing data on the recording area, and determines whether to re-record data recorded in the neighboring area based on the retrieved status information; and
   a re-recording unit that re-records data recorded in the neighboring area by retrieving data of the neighboring area from the monitor area, when the determining unit determines to re-record, and resets the status information corresponding to the recording area,
   wherein the re-recording unit includes a temporary storing unit that stores the data recorded in the monitor area whose address is spaced from both the recording area and the neighboring area to be re-recorded in a place other than on the magnetic disk until re-recording.

2. The apparatus according to claim 1, wherein
   the status information is a record count of the data in the recording area, and
   when the record count is equal to or more than a predetermined threshold, the re-recording unit re-records the data recorded in the neighboring area.

3. The apparatus according to claim 1, wherein
   the status information is an error rate of the data in the recording area, and
   when the error rate is equal to or more than a predetermined threshold, the re-recording unit re-records the data recorded in the neighboring area.

4. The apparatus according to claim 1, wherein
   the status information is a magnetic field strength of the recording area, and
   when the magnetic field strength is less than a predetermined threshold, the re-recording unit re-records the data recorded in the neighboring area.

5. A method of recording or reproducing data on a magnetic disk that employs a perpendicular magnetic recording and includes a recording area and a monitor area storing data of a neighboring area of the recording area, the method comprising:
   determining including
      retrieving status information relating to recording or reproducing data on the recording area; and
      determining whether to re-record data recorded in the neighboring area based on the retrieved status information; and
   re-recording including
      storing data recorded in the monitor area whose address is spaced from both the recording area and the neighboring area to be re-recorded in a place other than on the magnetic disk until re-recording when it is determined to re-record at the determining step;
      re-recording the data temporarily stored at the storing step to the neighboring area; and
      resetting the status information corresponding to the recording area.

6. The method according to claim 5, wherein
   the status information is a record count of the data in the recording area, and
   when the record count is equal to or more than a predetermined threshold, the storing includes storing the data recorded in the monitor area.

7. The method according to claim 5, wherein
   the status information is an error rate of the data in the recording area, and
   when the error rate is equal to or more than a predetermined threshold, the storing includes storing the data recorded in the monitor area.

8. The method according to claim 5, wherein
   the status information is a magnetic field strength of the recording area, and
   when the magnetic field strength is less than a predetermined threshold, the storing includes storing the data recorded in the monitor area.

* * * * *